United States Patent
Ko et al.

(10) Patent No.: US 12,305,333 B2
(45) Date of Patent: May 20, 2025

(54) METHOD OF SURFACE CHEMICAL FUNCTIONALIZATION FOR DEVELOPING OF FUNCTIONAL HYDROPHOBIC SURFACES

(71) Applicant: CITY UNIVERSITY OF HONG KONG, Kowloon (HK)

(72) Inventors: Chi-Chiu Ko, Kowloon (HK); Yelan Xiao, Kowloon (HK)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 868 days.

(21) Appl. No.: 17/411,644

(22) Filed: Aug. 25, 2021

(65) Prior Publication Data

US 2023/0063903 A1    Mar. 2, 2023

(51) Int. Cl.
*D21H 25/02*    (2006.01)
*C07F 7/08*    (2006.01)
*D21H 21/16*    (2006.01)

(52) U.S. Cl.
CPC ........... *D21H 25/02* (2013.01); *C07F 7/0834* (2013.01); *D21H 21/16* (2013.01)

(58) Field of Classification Search
CPC ........ D21H 25/02; D21H 21/16; C07F 7/0834
See application file for complete search history.

(56) References Cited

U.S. PATENT DOCUMENTS

2002/0048679 A1*  4/2002  Lohmer ............... C08J 7/12
                                          428/447

FOREIGN PATENT DOCUMENTS

JP          H11265058 A  *  9/1999  ............. B41N 1/14

OTHER PUBLICATIONS

Yelan Xiao, Wenfei Huang, Chi Pong Tsui, Guocheng Wang, Chak Yin Tang, Lei Zhong, Ultrasonic atomization based fabrication of bio-inspired micro-nano-binary particles for superhydrophobic composite coatings with lotus/petal effect, Composites Part B: Engineering, vol. 121, Jul. 15, 2017, pp. 92-98.*

Ng et al. Photoredox Catalysis of Cyclometalated IrIII Complex for the Conversion of Amines to Fluorinated Alkyl Amides. Asian Journal of Organic Chemistry. vol. 7, Issue 8, Aug. 2018, pp. 1587-1590.*

* cited by examiner

*Primary Examiner* — Amina S Khan
(74) *Attorney, Agent, or Firm* — Conley Rose, P.C.; Michael W. Piper; Gayatry Nair

(57) ABSTRACT

A photochemical method for chemical modification of a hydrophilic material to provide the surface of the material with hydrophobic properties. The method comprises functionalizing the surface to provide an amine group thereon, and then functionalizing the surface photo-catalytically to provide perfluoroalkanamide thereon. Alternatively, the method comprises reacting a silane moiety functional group on the surface of the material with a perfluoroalkylhalide in the presence of a photo-catalyst and light.

4 Claims, 21 Drawing Sheets n = 3 - 11

3-(trimethoxysilyl)propyllamine (APTMS)

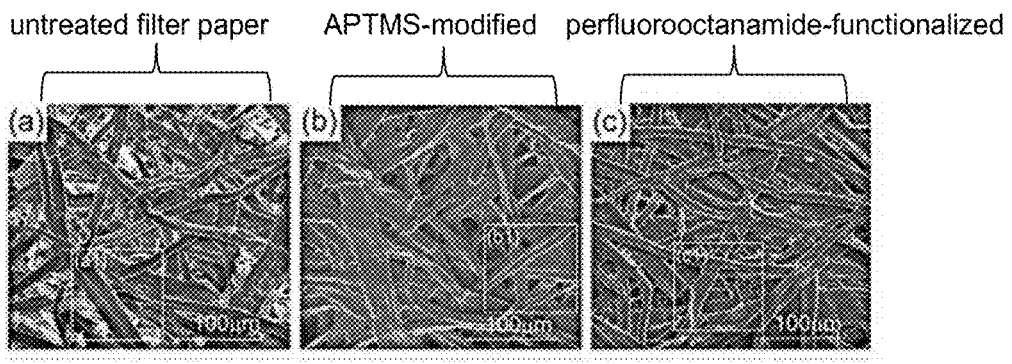
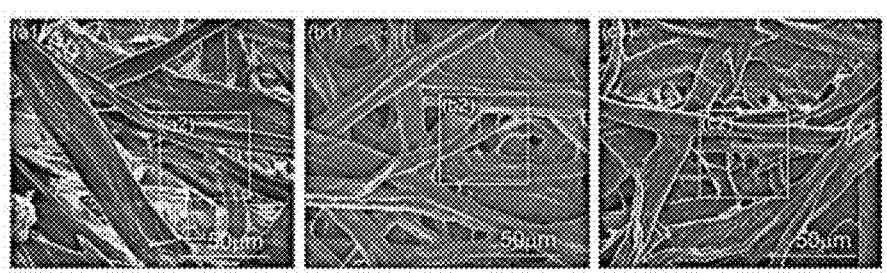
Figure 9b     Figure 9c     Figure 9d
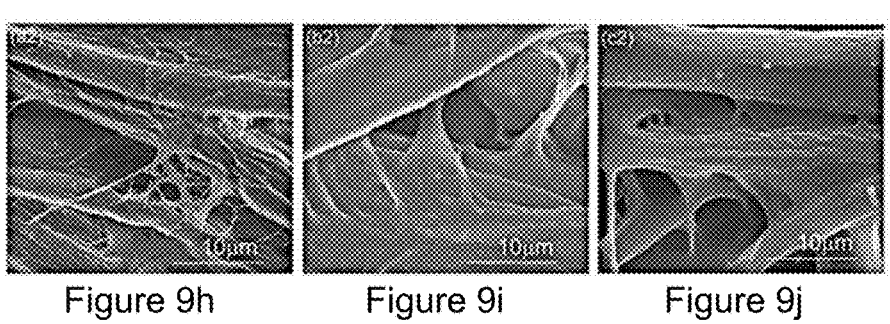
Figure 9e     Figure 9f     Figure 9g
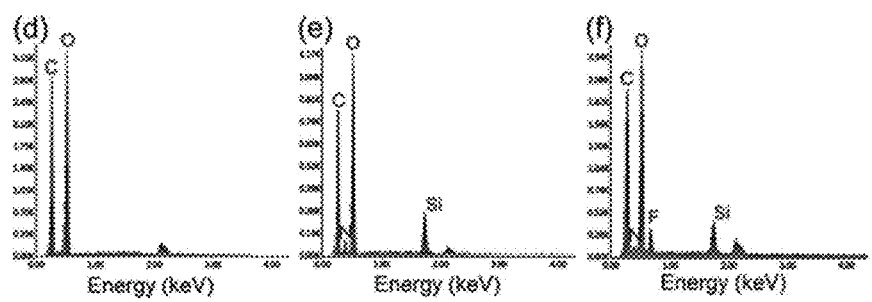
Figure 9h     Figure 9i     Figure 9j
Figure 9k     Figure 9l     Figure 9m
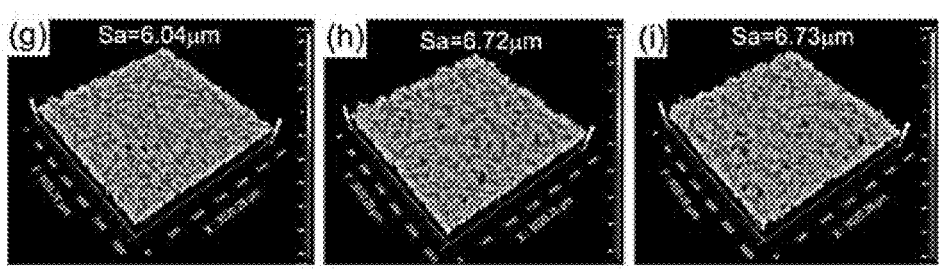
Figure 9n     Figure 9o     Figure 9p

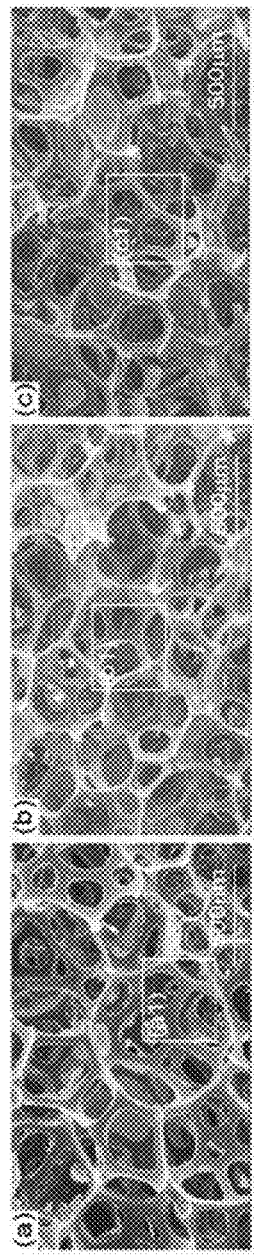
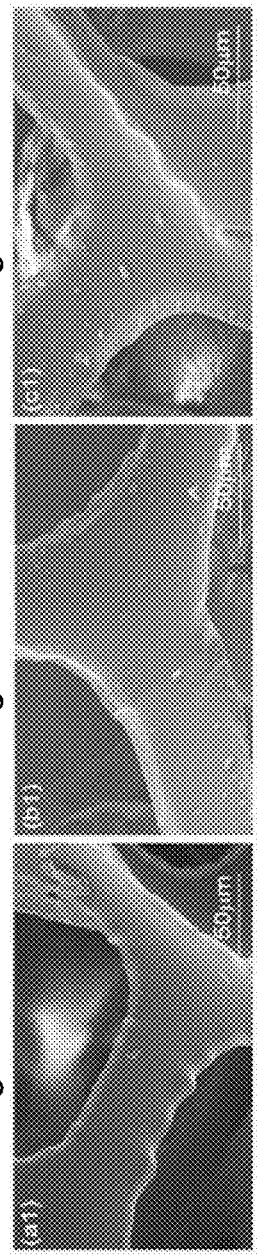
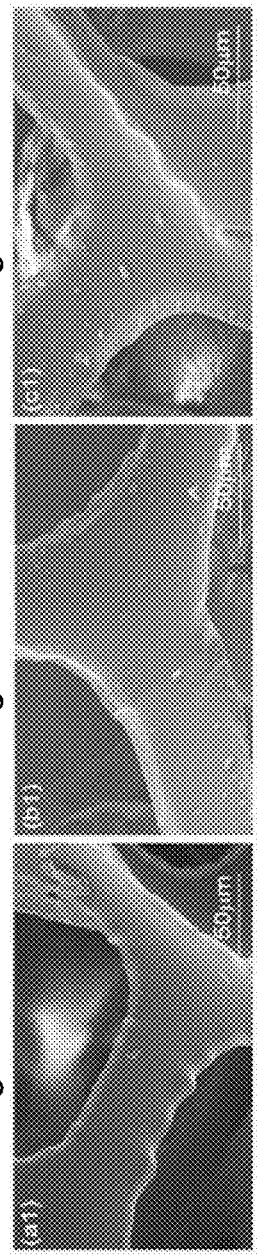
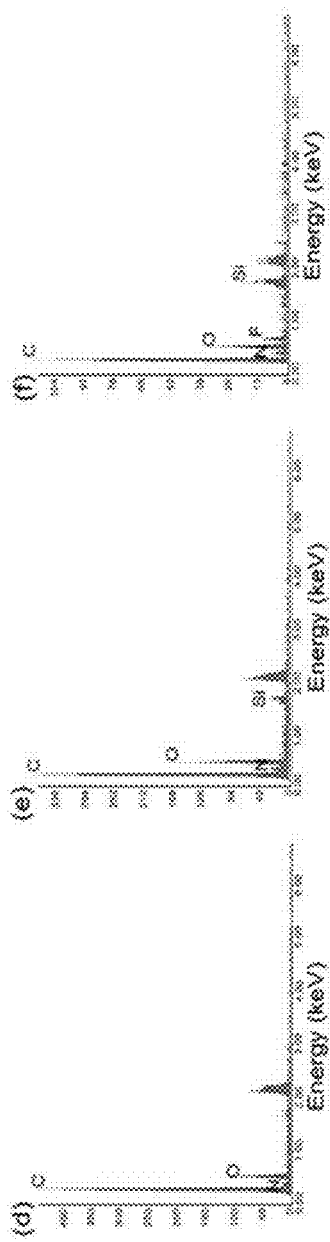
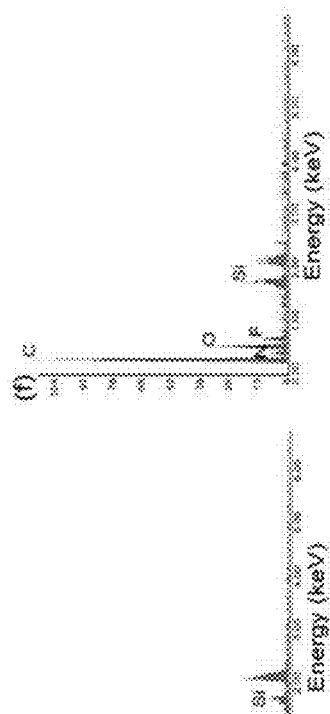
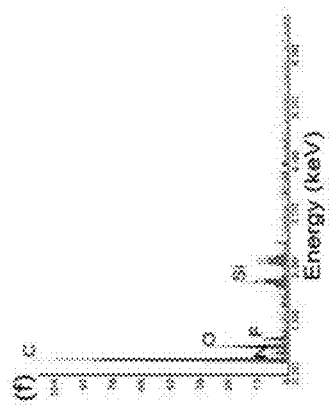
Figure 12a  Figure 12b  Figure 12c
Figure 12g  Figure 12h  Figure 12i
Figure 12d  Figure 12e  Figure 12f 1601 1603 1605

METHOD OF SURFACE CHEMICAL FUNCTIONALIZATION FOR DEVELOPING OF FUNCTIONAL HYDROPHOBIC SURFACES

FIELD OF THE INVENTION

The present invention relates to surface chemical functionalization for developing hydrophobic surfaces on hydrophilic materials, so as to impart thereto functional properties such as water repellence.

BACKGROUND

It is known that the hydrophobic or hydrophilic properties of the surface of a material can be changed by chemically functionalizing the surface energy of the material. Surficial modification of a material is useful because it is often not feasible to replace one material entirely with another material just for one or two properties of that other material. Most of the natural properties of the original material would be irreplaceable, such as its density, resilience, hardness and so on.

Surfaces of materials can be functionalized to possess self-cleaning, anti-fogging, anti-icing, anti-corrosive, stain-resisting, or drag-reducing properties that were not original properties of the materials. Materials with such functionalized surfaces can be used to make microfluidic devices, condensation devices for ambient water, separation devices for water and oil mixtures, biomaterials, and so on.

A surface can even be functionalized just physically, such as on nano-scale, to exhibit new chemical properties. Studies on natural interfacial properties of lotus leaves and water striders have shown that natural surficial hierarchical roughness provides surfaces with superhydrophobicity. On the other hand, a surface can also be functionalized chemically to have new chemical properties.

Such surface modification can be achieved by functionalizing hydrophobic molecular moieties on surfaces, using various surficial modification techniques such as plasma deposition, physical or chemical vapor deposition, atomic layer deposition, micro- or nano-particle deposition, sol-gel and photochemical surface treatment.

In one method, fluorinated hydrocarbons are used to chemically alter molecules on the surface of materials. In particular, surfaces have been silanized with perfluoroalkyl silanes. However, the high cost of perfluoroalkyl silanes together with low yield of silanization make these methods cost ineffective for industrial scale application. Furthermore, the relative instability of silanes does not allow for recovery and reuse.

Accordingly, it is desirable to develop a method of surficial modification, which can impart a hydrophobic property and/or surficial roughness in a better, more efficient and, possibly, cost effective manner.

STATEMENT OF INVENTION

In a first aspect, the invention proposes a method of functionalizing the surface of a material, comprising the step of: reacting a silane moiety functional group on the surface of the material with a perfluoroalkylhalide in the presence of a photo-catalyst and light.

Typically, the silane moiety functional group has the general formula $R_1SiR_2NH_2$, where $R_1$ and $R_2$ are organic chains. For example, the silane moiety functional group is n-(trimethoxysilyl)alkylamine. Preferably, the n-(trimethoxysilyl)alkylamine is 3-(trimethoxysilyl)propylamine (APTMS).

Preferably, the silane moiety functional group on the surface of the material is provided in a step of: silanizing the surface of the material with n-(trimethoxysilyl)alkylamine. Also preferably, the step of reacting a silane moiety functional group the surface of the material with a perfluoroalkylhalide comprises: reacting the amine group in n-(trimethoxysilyl)alkylamine with the perfluoroalkylhalide to form N-[3-(trihydroxylsilyl)alkyl] perfluoroalkanamide.

Preferably, the perfluoroalkanamide is perfluorooctanamide and the perfluoroalkyl halide is perfluorooctyl iodide.

Optionally, light is supplied to at least one selected area on the surface of the material through a stencil, such that the silane moiety functional group in the area is able to react with perfluoroalkylhalide in the presence of the photo-catalyst and light.

Therefore, in some embodiments, the perfluoroalkanamide is obtained from the steps of: surface silanization with n-(trimethoxysilyl)alkylamine and subsequent photo-catalytic amidation with a perfluoroalkylhalide under a heterogeneous condition. This can apply to hydroxyl-containing solid surfaces such as fabric, paper, wood, cement and the likes to undergo amidation in situ.

Both n-(trimethoxysilyl)alkylamine and perfluoroalkylhalide, particularly perfluoroalkyl iodide, are cheap materials in comparison with perfluoroalkyl silanes. Hence, by breaking the silanization of hydrophilic surfaces with perfluoroalkyl silanes into a two-stage process, these much cheaper materials may be used for a cost-effective industrial scale-up. One advantage of this is that only reacted n-(trimethoxysilyl)alkylamine is bound to the solid surface, and unreacted n-(trimethoxysilyl)alkylamine remains useable in the reaction solution for use another time. Similarly, only reacted perfluoroalkylhalide is bound to the solid surface, and unreacted perfluoroalkylhalide remains useable in the reaction solution for use another time.

Alternatively, the amine group in the n-(trimethoxysilyl)alkylamine is reacted with the perfluoroalkylhalide to form N-[n-(trihydroxylsilyl)alkyl] perfluoroalkanamide in a homogeneous photo catalytic reaction; followed by silanizing the surface of any hydroxy-containing surface of the materials with N-[n-(trihydroxylsilyl)alkyl] perfluoroalkanamide.

In a second aspect, the invention proposes a use of perfluoroalkyl iodide to functionalize in situ a solid surface of a hydrophilic material having amine groups.

The use of the heterogeneous photo-catalysis for surface functionalization offers a number of advantages over the single-step silanization of hydrophilic surfaces with perfluoroalkyl silanes used in the prior art. First, relatively low cost silanes can be used in the inefficient silanization process prior to the chemical functionalization of the silanized molecules with readily available and also low-cost functional groups. Second, the desirable extent and location of surface modification of the silanized molecules in the photo-catalytic chemical functionalization can be easily controlled by power, wavelength and time of irradiation. Third, since the functional molecules/reagents used in the photo-catalytic process are usually inert or much more stable, the excess functional molecules/reagents without photo-catalytic activation can be readily recovered and reused. As mentioned, breaking down the process by using perfluoroalkyl iodide subsequently to silanization of a hydrophilic surface that has been treated with, for example, 3-(trimethoxysilyl)propylamine avails to one a cheaper process. Also, this provides the possibility of recovering unreacted perfluoroalkyl iodide for reuse.

Preferably, the hydrophilic material is pre-treated with a silane having an amine group to provide the amine. More preferably the silane is 3-(trimethoxysilyl)propylamine.

In a further aspect, the invention proposes use of N-[n-(trihydroxylsilyl)alkyl] perfluoroalkanamide to functionalize in situ a solid surface of a hydrophilic material, wherein the N-[n-(trihydroxylsilyl)alkyl] perfluoroalkanamide is formed of n-(trimethoxysilyl)alkylamine reacting with perfluoroalkyl iodide in a photo-catalytic reaction. In other words, N-[n-(trihydroxylsilyl)alkyl] perfluoroalkanamide may be produced in a homogeneous photo-catalysis first before being applied to the hydrophilic materials.

In a further aspect, the invention proposes a hydrophilic material, the hydrophilic material comprising a surface silanized with n-(trimethoxysilyl)alkylamine. This provides a semi-processed intermediate raw material for completing the process with perfluoroalkyl iodide later. Besides being a reasonable semi-completed product for commercial purposes, the process may be completed by the end-user for optimization purposes in the pertinent factory.

Optionally, the hydrophilic material is loaded/submerged in a solution comprising perfluoroalkyl iodide. Preferably, the solution further comprises a photo-catalyst, such as fac-[Ir(ppy)$_3$].

In a further aspect, the invention proposes cotton-containing fabric materials that are functionalized with the described methods. Such a fabric finds use in being anti-wetting, water-resistant and is suitable for use in rainy or wet locations.

In a further aspect, the invention proposes cellulose-based materials such as filter papers that are functionalized with the described methods. Such paper is selective permeable to organic solvents such as n-pentane, n-hexane, dichloromethane, chloroform, toluene, benzene, ethers, oils and the like and impermeable to water, and is suitable for use in separating oil-water biphasic mixtures.

In yet a further aspect, the invention proposes a sponge that is functionalized with the described methods. Such a sponge finds great application in soaking up oil or organic solvent spills or selectively soaking oil or organic solvents in an oil-water biphasic mixture.

In yet a further aspect, the invention proposes a cementitious material that is functionalized with the described methods. This is particularly use preventing seepage of moisture and rot into buildings.

In yet a further aspect, the invention proposes a wooden surface that is functionalized with the described methods. This is particularly use preventing rot of wooden furniture, and also offers a further aesthetic option for furniture besides varnish and lacquer.

In yet a further aspect, the invention proposes a photomask for use in irradiating the surface of a material partially for functionalizing with perfluoroalkanamide. This allows the surface of the material to be roughened in a deliberately pattern for improving structure-based hydrophobicity.

Accordingly, the invention provides the possibility of a novel chemical surface functionalization method. With this photochemical method, low-cost and readily available perfluoroalkyl iodide can be used for surface functionalization. The chemically functionalized surfaces not only convert hydrophilic surfaces of cellulose-based materials to hydrophobic and oleophilic but also exhibit excellent water-repellency. This method could apply to surface with hydroxyl- and amine-functional groups.

BRIEF DESCRIPTION OF THE DRAWINGS

It will be convenient to further describe the present invention with respect to the accompanying drawings that illustrate possible arrangements of the invention, in which like integers refer to like parts. Other embodiments of the invention are possible, and consequently the particularity of the accompanying drawings is not to be understood as superseding the generality of the preceding description of the invention.

FIGS. 9b-9p show SEM (scanning electron microscope), EDS (Energy-dispersive X-ray Spectroscopy) images of paper made by the process of FIG. 3;

FIG. 11 demonstrates the water/organic solvent biphasic separation property of the paper shown in FIG. 10a;

FIGS. 12a-12i show the structure and morphology of sponge that has been functionalized by the embodiment of FIG. 3;

DETAILED DESCRIPTION OF EMBODIMENTS

Figure 1:
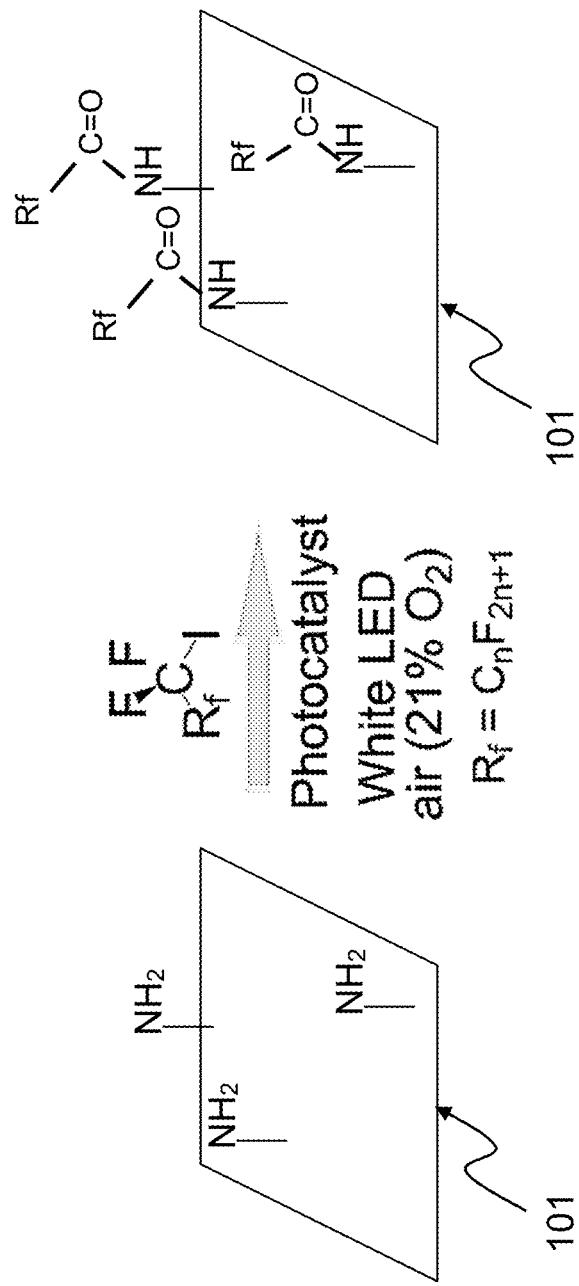
FIG. 1 shows an embodiment of the invention.
Figure 2:
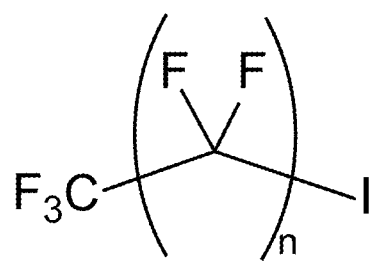
FIG. 2 shows a molecular structure of an ingredient used in the embodiment of FIG. 1.

FIG. 1 illustrates an embodiment of the invention. A material which naturally has an amine group on its surface is subjected to a photo-redox reaction in the presence of perfluoroalkyl iodide. This causes photo-catalytic amidation of the perfluoroalkyl iodide, producing perfluoroalkanamide on the material surface. The perfluoroalkanamide gives the surface high water repellence, wetting selectivity, and oleophilicity. FIG. 2 shows the structure of perfluoroalkyl iodide. It is the perfluoroalkyl chain that is hydrophobic.

Figure 3:
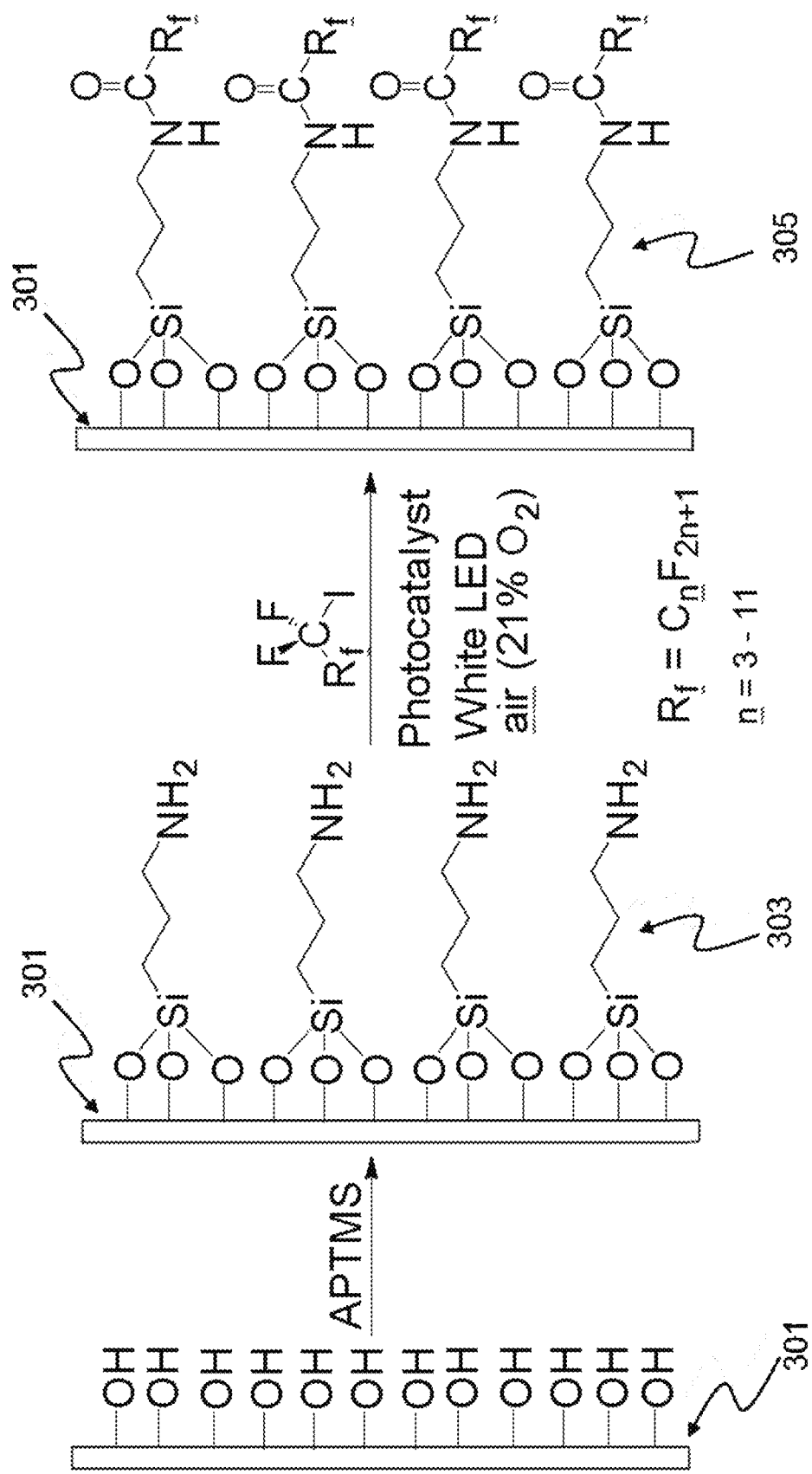
FIG. 3 shows a further embodiment that includes the embodiment of FIG. 1.
Figure 4:
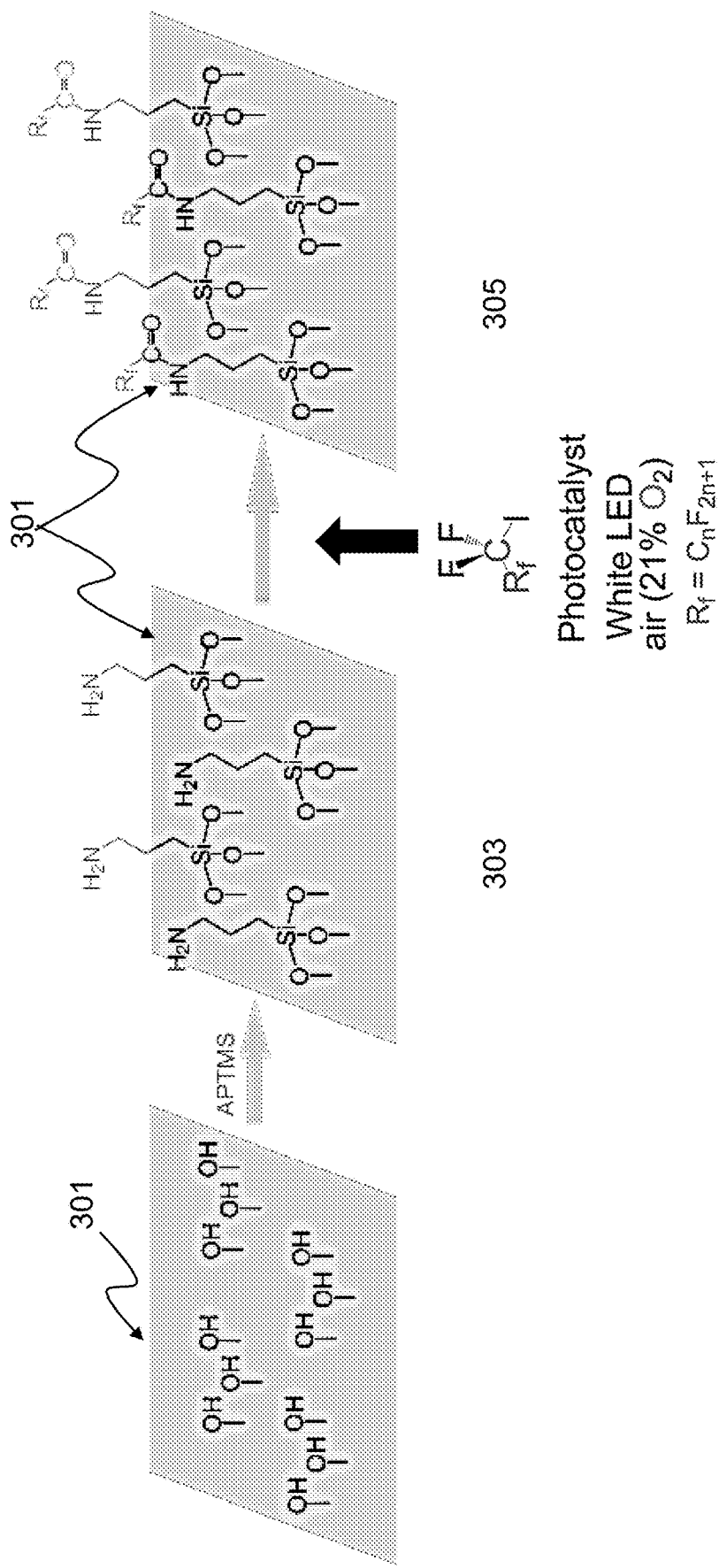
FIG. 4 is an alternative illustration of FIG. 3.

However, many common materials used in household products tend to have a certain degree of hydrophilic character. For example, paper, which is cellulose-based, is naturally hydrophilic because of hydroxyl groups on the surface of cellulose fibres. This causes paper to be wet easily. Hence, many good pieces of work have been destroyed by a water, coffee or tea spill. Accordingly, it is desirable to impart a degree of hydrophobicity to paper to minimise possible damage by such accidents. Unfortunately, the hydroxyl functional group is not amenable to react photo-catalytically with a perfluoroalkyl iodide in the same way as an amine group does. FIG. 3 and FIG. 4 illustrate another embodiment, one that provides a possibility of overcoming this problem.

Figure 5:
FIG. 5 is the molecular structure of an ingredient used in the embodiment of FIG. 3.

FIG. 3 and FIG. 4 illustrate how an n-(trimethoxysilyl) alkylamine, preferably as 3-(trimethoxysilyl)propylamine (APTMS), is applied onto the surface of a cellulose-based paper 301, at 303. Generally, this process is called silanization, which is the covering of a surface with organofunctional alkoxysilane molecules. FIG. 5 shows the molecular structure of APTMS. Hydroxyl groups can attack and displace the alkoxy groups on silane to form a covalent —Si—O—Si— bond. Therefore, the methoxy groups on the APTMS are capable of reacting with the hydroxyl groups of the cellulose to be affixed to the cellulose, thereby providing amine groups on the paper surface 301.

Advantageously, silanization of the paper surface provides the surface with a degree of roughness on the nanoscale level. This gives a possibility that the surface becomes hydrophobic by virtue of new and artificial surface physical structure, mimicking the way how lotus leaves are hydrophobic naturally. In some variations of the embodiment, therefore, the surface treatment can stop at this stage. However, in the preferred embodiment, the silanization is merely a pre-treatment stage.

In the next stage, the paper is treated with perfluoroalkyl iodide, similar to the treatment described in FIG. 1. The amine group contributed by silanization with APTMS is capable of reacting with perfluoroalkyl iodide in the presence of light and a photo-catalyst to provide the surface with perfluoroalkanamide, at 305.

Figure 6:
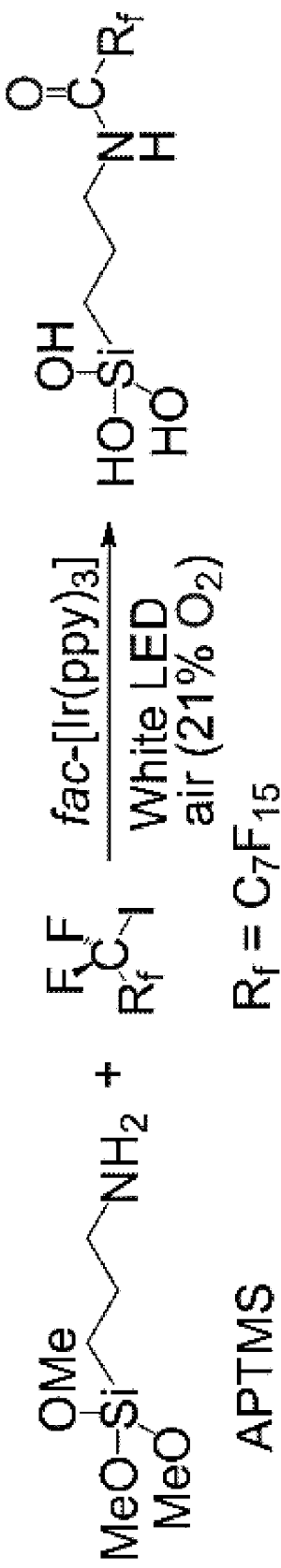
FIG. 6 shows a homogeneous photo-catalytic reaction that is alternative to the reaction used in the embodiment of FIG. 3.

Photo-reacting perfluoroalkyl iodide with APTMS that is already affixed to solid surface is called a heterogeneous photo-catalytic process. FIG. 6 shows the homogeneous equivalent, in which APTMS dissolved in a solvent and not bound to any solid surface reacts with a perfluoroalkyl iodide. For example, APTMS and perfluorooctyl iodide may react in a photo-catalytic reaction in a solvent to in the presence of fac-[Ir(ppy)$_3$] to produce N-[3-(trihydroxylsilyl) propyl] perfluorooctanamide. The disadvantage of homogenous photo-catalysis is that unused APTMS cannot be recovered easily from the solvent for re-use.

In contrast, in the heterogeneous photocatalytic process, a solid surface is treated and surficial affixed with perfluoroalkanamide can be removed from the solution of perfluoroalkylhalide, and any unreacted perfluoroalkylhalide remains in the solution for use another time. This reduces waste reactants and saves an immense amount of cost, making the process suitable for industrial scale application.

Figure 7:
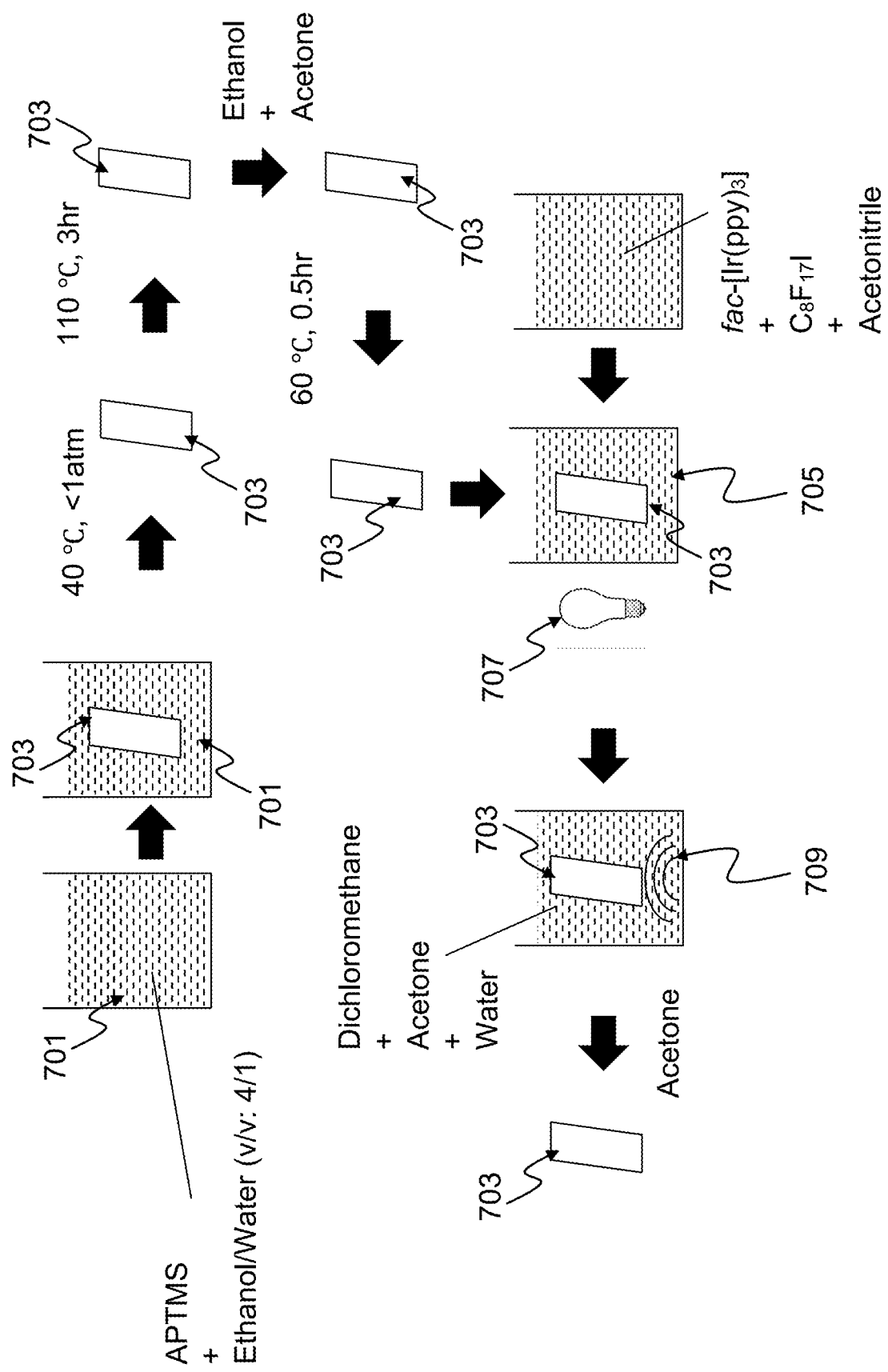
FIG. 7 illustrates the process used in the embodiment of FIG. 3.

FIG. 7 illustrates one possible procedure for carrying out the reaction stages of the embodiment shown in FIG. 3. Firstly, APTMS is dissolved in an ethanol/water solvent mixture (v/v: 4/1), at 701. After that, a cellulose-based filter paper 703 is immersed into the solution for 3 hours at room temperature. This allows the paper to become silanized with the APTMS.

Subsequently, the filter paper 703 is removed and stored at 40° C. under reduced pressure for 3 hours to vaporise the solvent mixture from the filter paper 703. The filter paper 703 is then stored at 110° C. for a further 3 hours before being washed thoroughly with ethanol and acetone. The filter paper 703 is then dried at 60° C. for 0.5 hour to remove all traces of the solvents.

Figure 8:
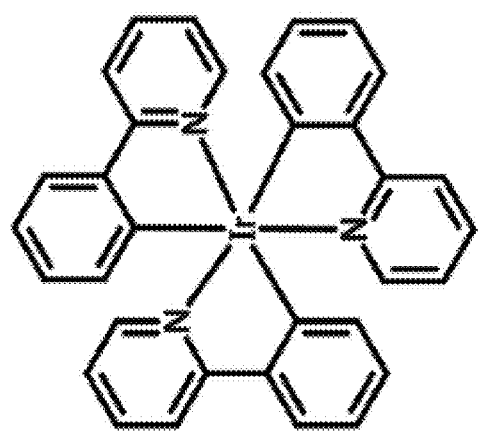
FIG. 8 is the molecular structure of a photo-catalyst used in the embodiment of FIG. 3.

Subsequently, the now APTMS-functionalized filter paper is loaded/submerged in a solution of perfluorooctyl iodide (0.043 M) and fac-[Ir(ppy)$_3$] (0.43 mM) (fac-tris(2-phenylpyridine)iridium) in acetonitrile, at step 705. The structure of tris(2-phenylpyridine)iridium is shown in FIG. 8.

As the skilled man knows, fac-[Ir(ppy)$_3$] is a photosensitizer for photochemical reduction reactions in the presence of amine as the electron donor. Apart from fac-[Ir(ppy)$_3$], many other triplet photosensitizers can be used as photocatalysts, and these do not require further discussion herein.

Figure 9A:
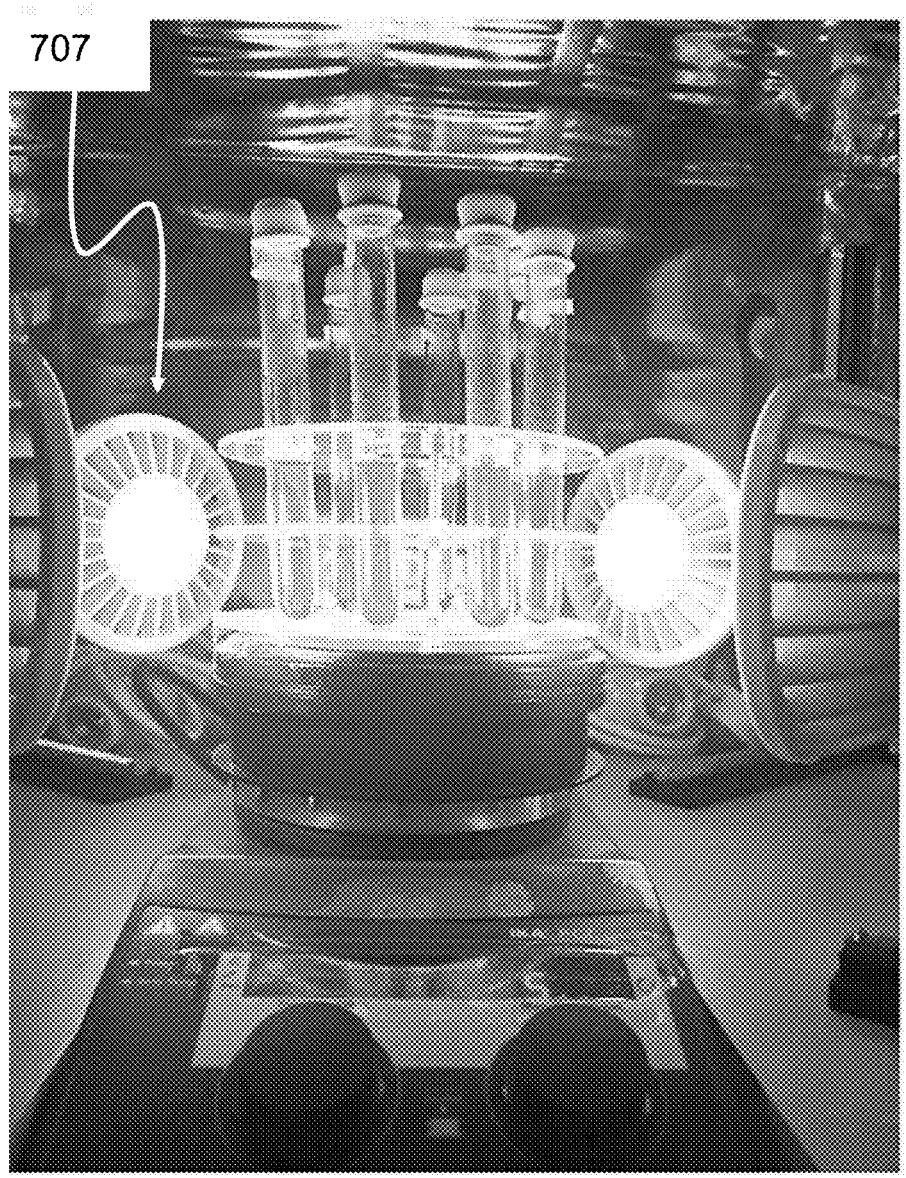
FIG. 9a is a set up for the process used in the embodiment of FIGS. 3, 6 and 7.

The mixture is then irradiated by a white-light LED (Osram Parathom 13W) 707 for an hour, using the setup such as the example shown in FIG. 9a.

Fresh supply of perfluorooctyl iodide (0.043 M) and fac-[Ir(ppy)$_3$] (0.43 mM) in acetonitrile solution is added in 30 minutes intervals to avoid drying out of the solution by the strong light.

The paper is then removed from the solution and washed by sonication, at step 709, in dichloromethane, acetone and water. After that, the paper is rinsed with a copious amount of acetone. The now chemically-functionalized paper is then dried to remove the last traces of solvents.

FIGS. 9b-9p show the SEM images (FIGS. 9b-9j), EDS analysis (FIGS. 9k-9m) and 3D optical profiler topography images (FIGS. 9n-9p) of untreated filter paper (FIGS. 9b, 9e, 9h, 9k, 9n), APTMS-functionalized filter paper (FIGS. 9c, 9f, 9i, 9l, 9o) and perfluorooctanamide-functionalized filter paper (FIGS. 9d, 9g, 9j, 9m, 9p). The surface characteristics of the filter papers before and after chemical modifications have also been studied. These images reveal the high micro- and nanoscale surface roughness of the cellulose fibres on their surfaces. The differences in surface roughness and morphologies (see FIG. 9h, FIG. 9i, and FIG. 9j) are supportive evidence of successful chemical modification by treatment of APTMS, and by photo-catalytic amidation.

The EDS analysis show the presence of the elements silicon (Si) (7.82 wt. %) and nitrogen (N) (6.03 wt. %) in the APTMS-functionalized filter paper (FIG. 9l). Similarly, Si (6.98 wt. %), N (5.63 wt. %) and fluorine (F) (6.73 wt. %) can be found in perfluorooctanamide-functionalized filter paper (FIG. 9m).

The SEM image and EDS analysis corroborate the successful surface modification. That is, the distributions of different elements in perfluorooctanamide-functionalized filter paper based on scanning electron microscopy with energy-dispersive spectroscopy (SEM-EDS) mapping confirm the widespread functionalization of the cellulose fibres with APTMS and perfluorooctanamide.

Silanization with APTMS provides a further possible advantage of increasing the amount of connections at the interfaces between cellulose fibres. This is likely due to the bridging ability of the silane anchoring groups. That is, a single silyl group cross linking two or more hydroxyl groups which are on different cellulose fibres. This provides a measure of roughness to the paper surface on a nano-level scale. As a result, the nano-scale surface roughness increases (6.72 µm vs. 6.04 µm before treatment) with considerably changed surface morphology, as revealed in 3D optical profiler topography images (compare FIG. 9o with FIG. 9n). Further functionalization of amine groups on the APTMS-functionalized filter paper with the perfluorooctanamide functional moiety also affects the surface roughness, as revealed in FIG. 9o and FIG. 9p. However, as the scale of surface roughening is on the nano-scale, the increase in roughness and change in surface morphology is not detectable to human touch. Hence, the product does not feel altered to the user at all.

Figure 10A:
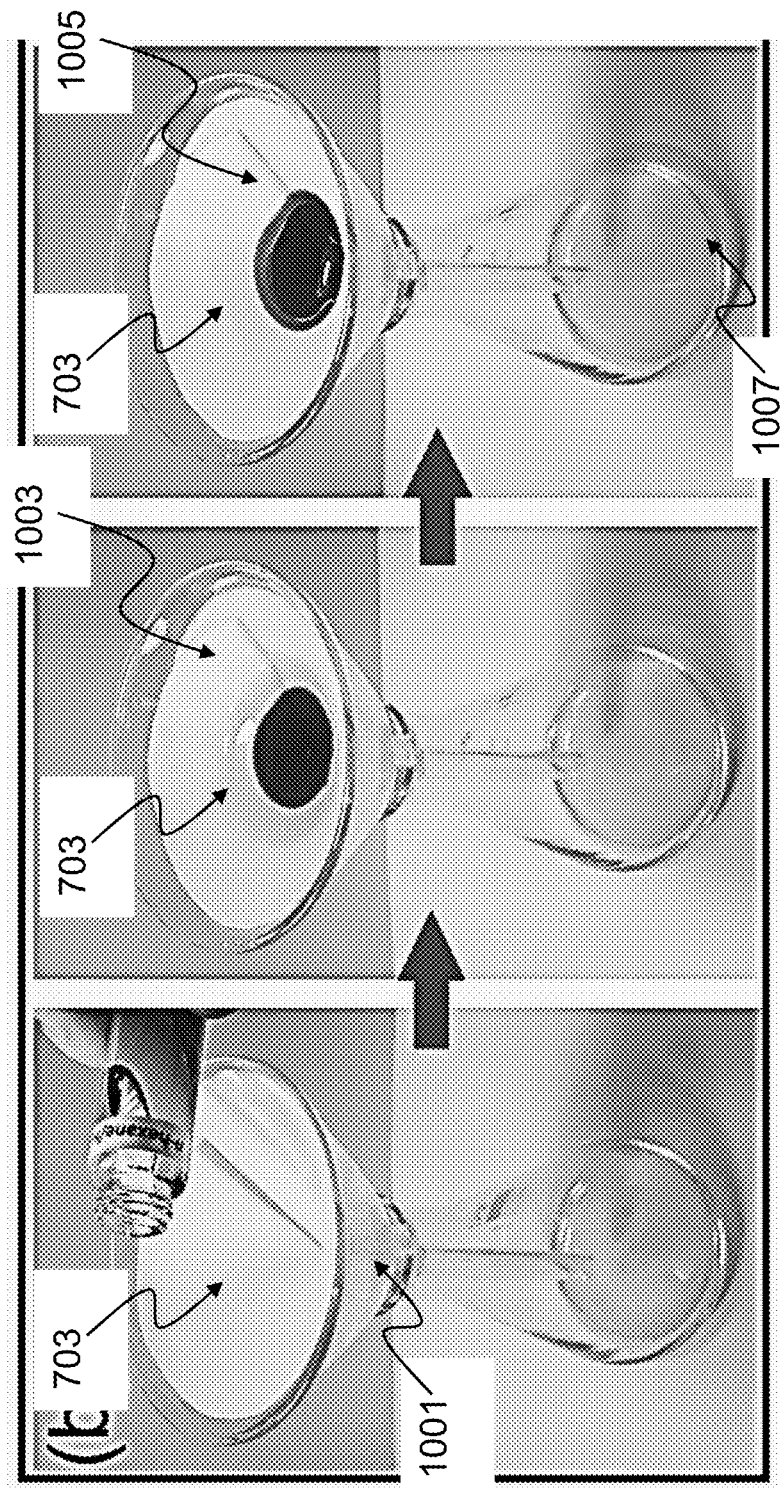
FIG. 10a and FIG. 10b demonstrate the selective permeability of paper that has been functionalized by the embodiment of FIG. 3.
Figure 10B:
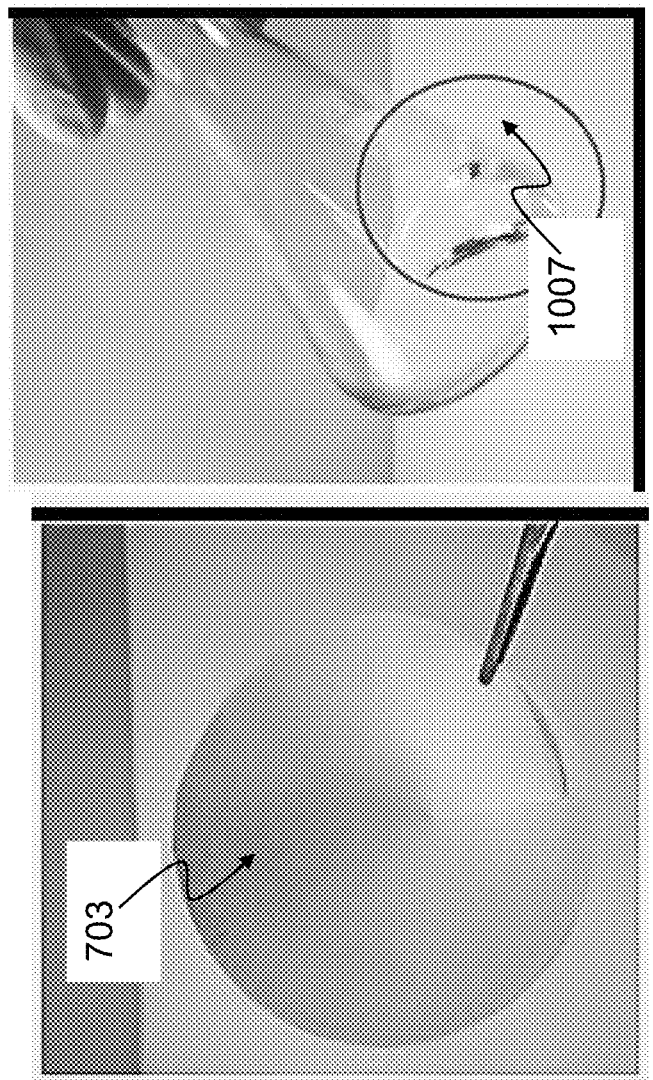
Figure 11:
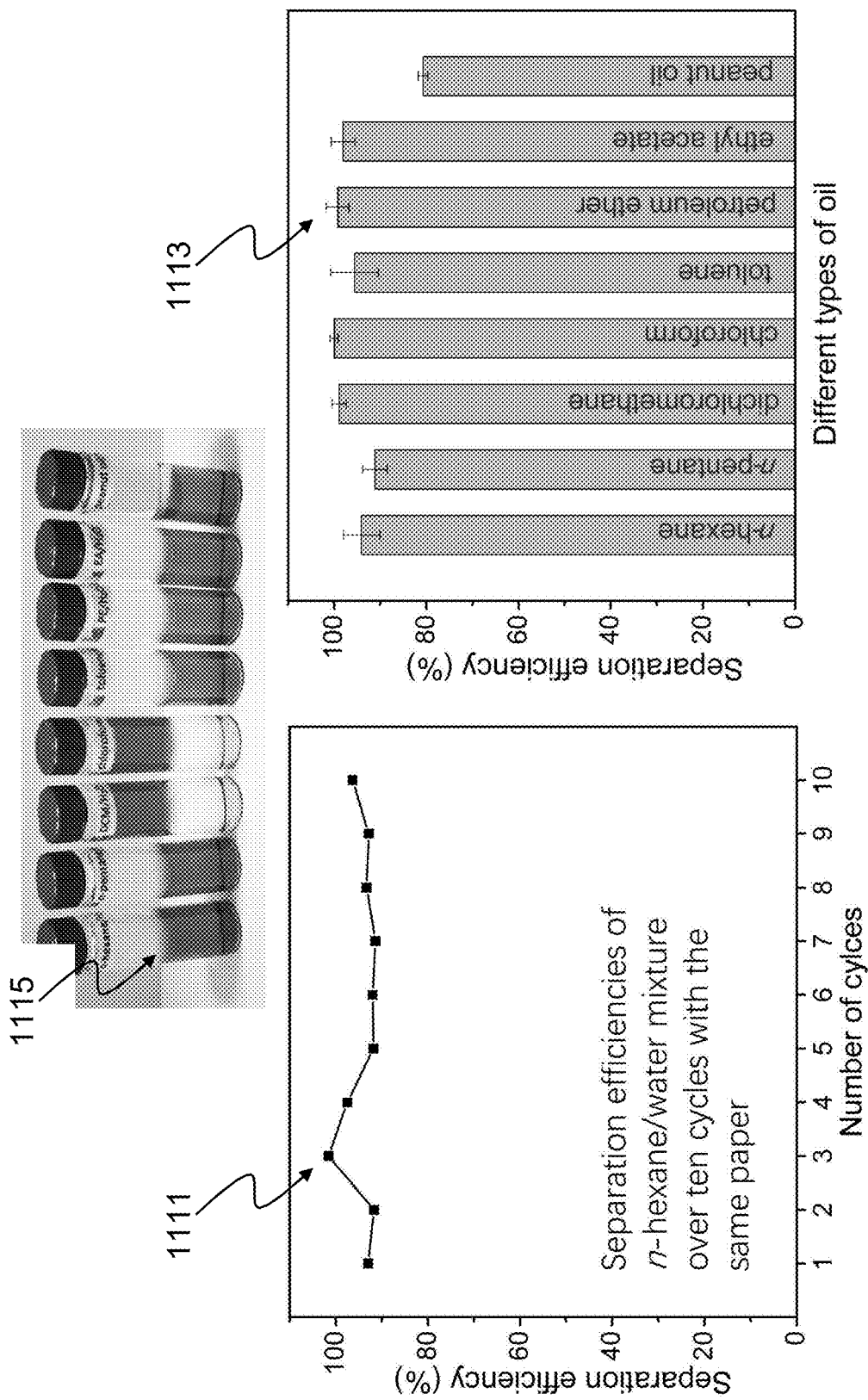

FIG. 10a, FIG. 10b and FIG. 11 demonstrate the use of the chemically-functionalized filter paper in aqueous-organic biphasic separation. The filter paper 703 is folded and fitted into a filter funnel 1001. An organic solvent/water mixture 1003 is poured into the funnel. The organic solvent 1007, such as n-hexane, n-pentane, dichloromethane, chloroform, petroleum ether, ethyl acetate, or toluene, or oil, is capable of penetrating the filter paper to be collected by a conical flask beneath the filter funnel. The aqueous layer 1005 with dark-colour dye remains on the filter paper. After removal of the dark-dyed aqueous layer, the filter paper did not show any dark colour. Virtually no aqueous part of the solution can penetrate the filter paper in the separation processes, or even stain the paper.

The top photograph 1115 in FIG. 11 shows a plurality of tubes of different organic solvents which have been tested on the treated, hydrophobic filter paper. The dark portion in each tube is dyed water. The lower left picture 1111 of FIG. 11 shows the separation efficiencies of n-hexane/water mixture over ten cycles; in ten attempts to separate the same mixture with the same filter paper, the separation efficiency remains consistently over 90%. The lower right picture 1113 of FIG. 11 shows the separation efficiencies of the filter paper for different organic solvent/water mixtures, based on five separation cycles with the same, respective, filter paper. Besides proving that the filter paper has indeed been chemically functionalized, the repeated use of the same filter paper also demonstrates the stability of the functionalized surface.

FIGS. 12a-12i relate to another embodiment, and show the change in chemical compositions and surface characteristics of polymeric sponge surfaces before and after chemical modifications. The images were taken using SEM (Scanning Electron Microscopy) and EDS (Energy-dispersive X-ray Spectroscopy). FIG. 12a shows the SEM and EDS observations of untreated polymeric sponge. FIG. 12b shows the SEM and EDS observations of APTMS-functionalized sponge. FIG. 12c shows the SEM and EDS observations of perfluorooctanamide-functionalized sponge surfaces. All these polymeric sponges have a typical open-cell porous spongy structure.

The sponges treated with APTMS (FIG. 12b) and photo-catalytic amidation (FIG. 12c) show no obvious changes in its microscopic structures in the micrometre level in comparison with images of the pristine sponge (FIG. 12a). However, the sub-micron morphologies of these chemically-functionalized sponge surfaces can be seen to have been roughened. See in particular, the images of the microstructural surface of treated sponge FIGS. 12h and 12i, and compare the images with that of the untreated sponge shown in FIG. 12g. The surface of the structure in FIG. 12g is relatively smooth. In contrast, the surface profile of the structure in FIG. 12h looks pitted, which is attributable to random attachment of the APTMS to the surface, and probably also to the random orientation of propylamine group on the APTMS. The roughening of the perfluorooctanamide-functionalized sponge structure is even more pronounced and noticeable, having even more pits.

In the EDS spectra, FIG. 12e shows that silicon (Si) is detected in the APTMS-functionalized fabric surfaces, while FIG. 12f shows the presence of Si and fluorine (F) is detected in perfluorooctanamide-functionalized sponges. FIG. 12d shows no such elements in the EDS of the untreated sponge.

Figure 13:
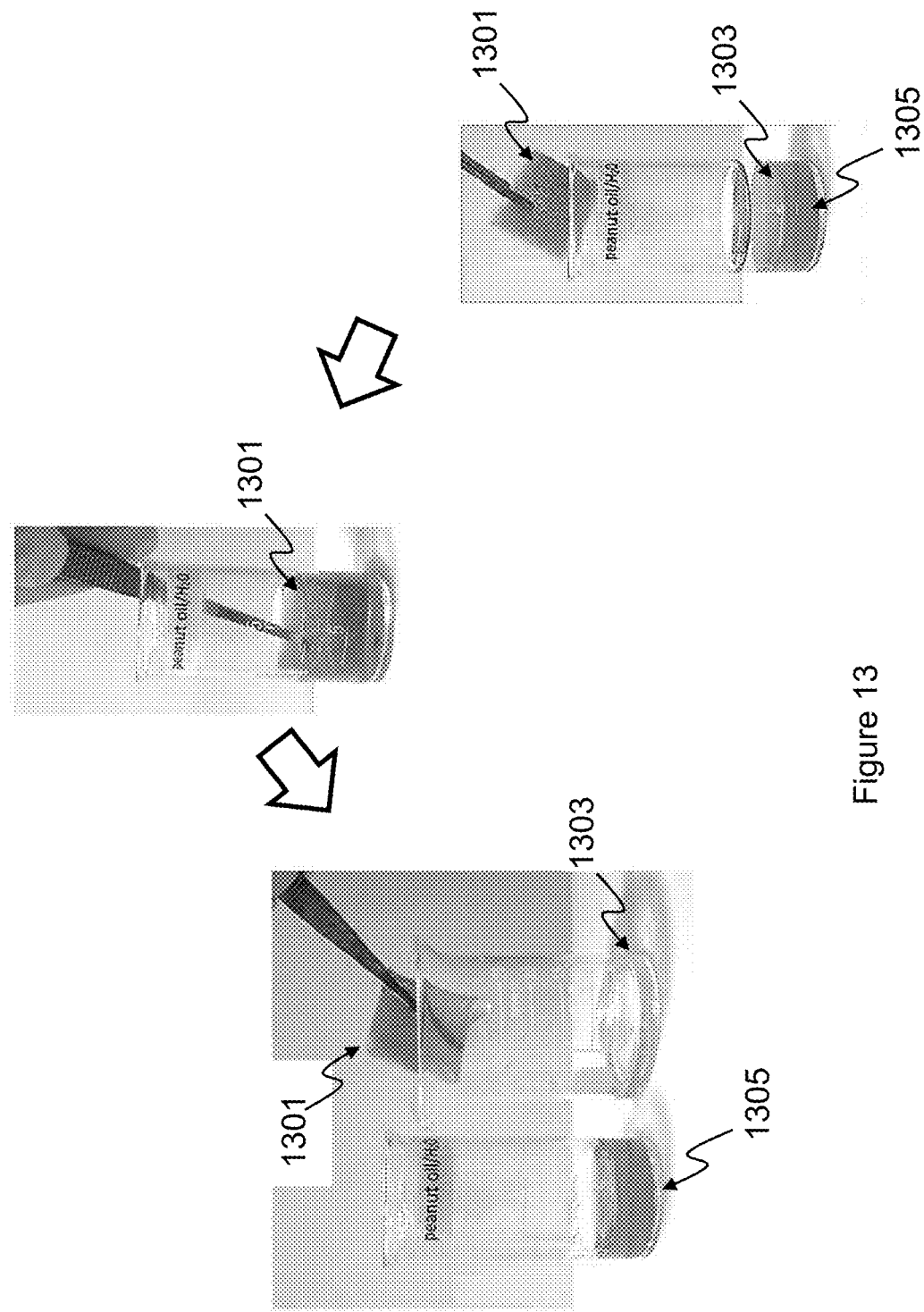
FIG. 13 demonstrates the selective oil soaking property of the sponge shown in FIGS. 12a-12i.

FIG. 13 shows the perfluorooctanamide-functionalized sponge 1301 being tested, by being placed into a solvent mixture containing peanut oil and water. The water is dark-dyed for visibility and differentiability in the black and white image. The peanut oil is the light coloured liquid. As the surface of the microstructures in the sponge has been made hydrophobic, oil in the mixture can be absorbed by the sponge easily and then squeezed out from the sponge into a beaker. The water is not soaked up by the sponge, and remains in the container. This demonstrates how sponge which been functionalized can selectively absorb oleaginous/organic fluids.

Experiments have shown that the oleaginous/organic fluids can be n-hexane, n-pentane, dichloromethane, chloroform, petroleum ether, ethyl acetate, or toluene, or oil, or the like. The sponge can be made to be more selectively absorbent to heavier or lighter organic molecules by the selecting length of the perfluoroalkyl group. As shown in FIG. 2, the length of perfluoroalkyl iodide is preferably n=3 to 11, which is deemed the best range for most practical purposes. The longer the molecule, as the skilled reader would appreciate, the greater the hydrophobicity generally. Advantageous, this range of lengths of the perfluoroalkyl groups do not make the treated surface too noticeably different from the original state of the material.

Figure 14:
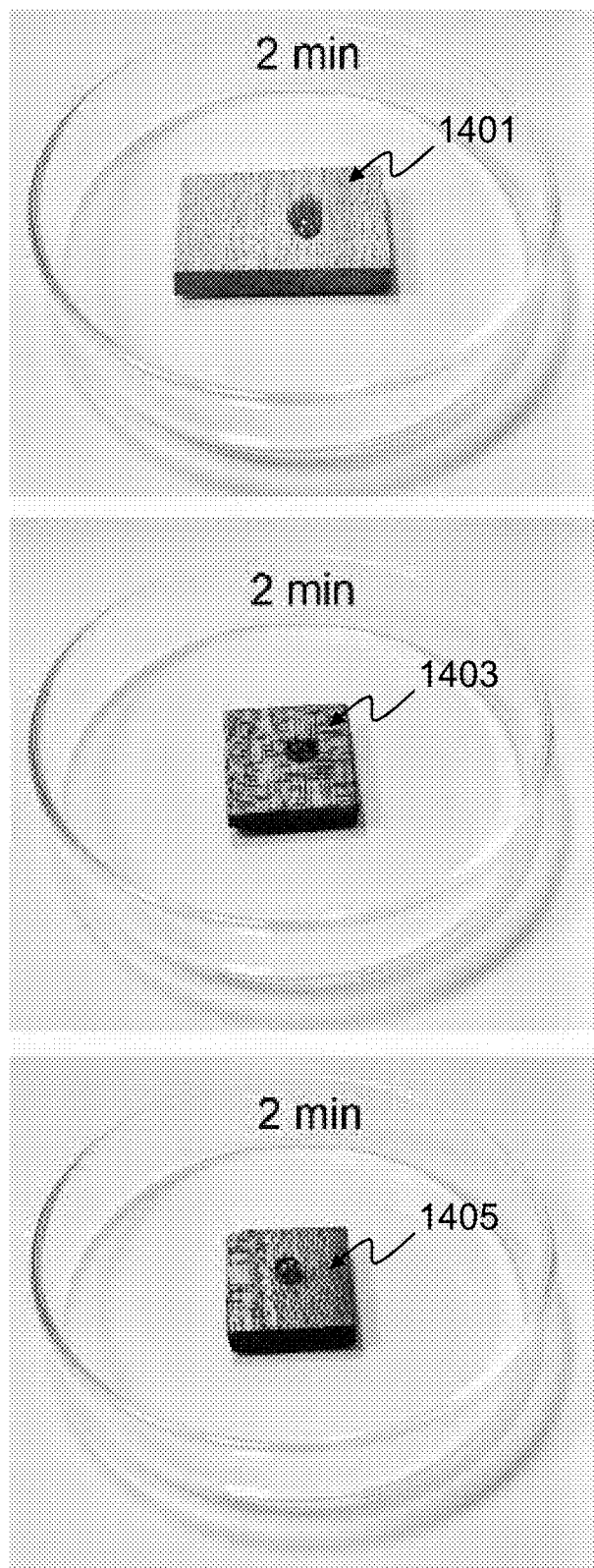
FIG. 14 demonstrates the hydrophobic and water-repellent property of wood that has been functionalized by the embodiment of FIG. 3.

FIG. 14 relates to another embodiment. The top photograph of FIG. 14 shows a drop of water that has spread itself over untreated wooden surface 1401. The middle photograph of FIG. 14 shows a drop of water on a wooden surface 1403 that has been functionalized with APTMS to provide amines groups on the wooden surface 1403. The drop of water holds itself together because of the wood's hydrophobic property. The bottom photograph of FIG. 14 shows a drop of water on a wooden surface 1405 that has been further functionalized with perfluorooctanamide. The water droplet is not visibly spread out at all, showing the strong water repellence from perfluorooctanamide. Hence, such wood which has surface functionalized with perfluorooctanamide is capable of dispelling moisture to prevent rotting of the wood. Possibly, wood with hydrophobic surface is able to absorb linseed oils, teak wood oils or other wooden restoration oils more easily for maintenance. An additional advantage is that functionalizing wood on the nano-scale level with perfluorooctanamide does not change the look of the wood, unlike wood treated with lacquer or varnish.

Figure 15:
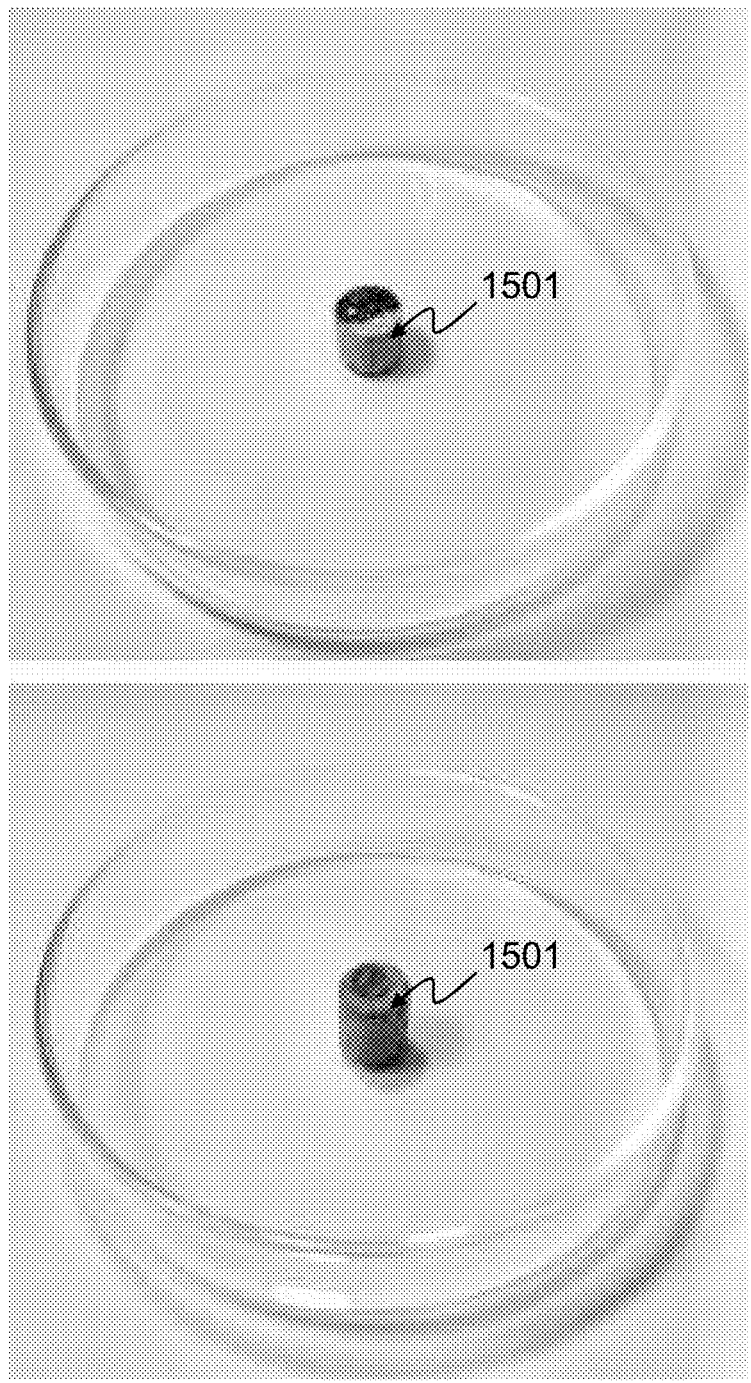
FIG. 15 demonstrates the hydrophobic and water-repellent property of cement that has been functionalized by the embodiment of FIG. 3.

FIG. 15 relates to yet another embodiment. FIG. 15 shows the difference between untreated cement 1501 and perfluorooctanamide functionalized cement 1503. The top photograph shows a water droplet that is attracted to and has spread itself over an untreated cement surface 1501. The bottom photograph shows a cement surface functionalized with perfluorooctanamide 1503. The water droplet was not absorbed into the cement 1503 because of the perfluorooctanamide, as seen by the greater contact angle of the water with the cement.

Figure 16A:
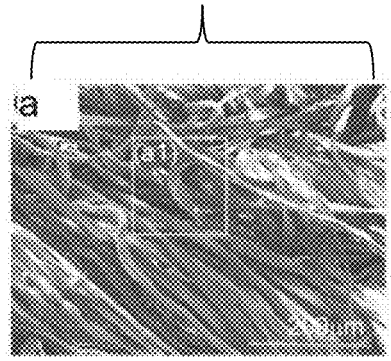
FIGS. 16a-16l are SEM (scanning electron microscope) and EDS (Energy-dispersive X-ray Spectroscopy) images of fabric that has been functionalized by the embodiment of FIG. 3.
Figure 16B:
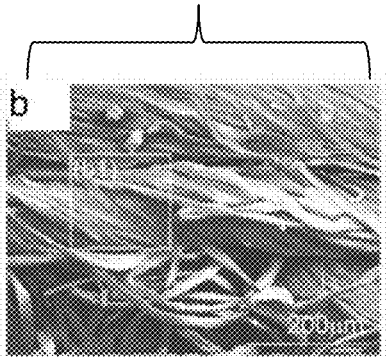
Figure 16C:
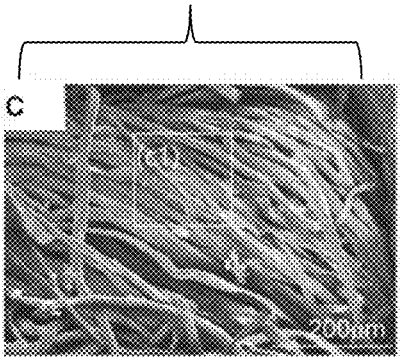
Figure 16D:
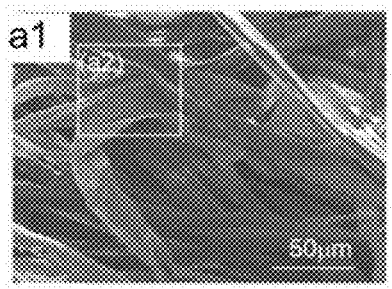
Figure 16E:
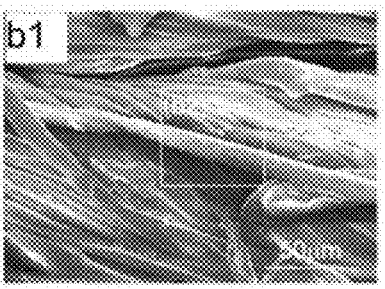
Figure 16F:
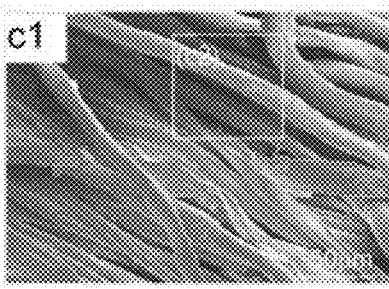
Figure 16G:
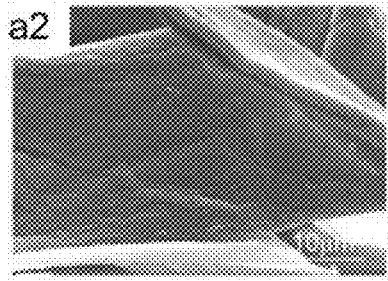
Figure 16H:
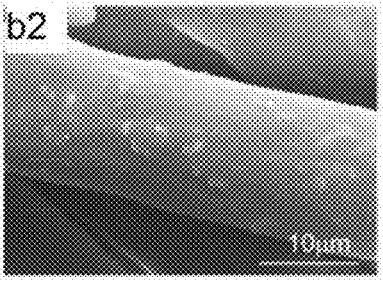

FIGS. 16a-16l relate to another embodiment. FIGS. 16a-16l show the chemical compositions and surface properties of 100% cotton fabric before and after chemical modifications, using SEM and EDS. FIG. 16a, FIG. 16d, and FIG. 16g are SEM images of the surface of untreated 100% cotton fabric 1601. FIG. 16b, FIG. 16e, and FIG. 16h are SEM images of the surface of APTMS-functionalized fabric 1603.

Figure 16I:
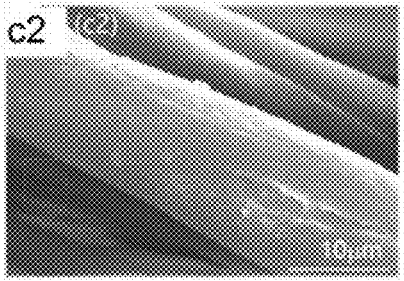

FIG. 16c, FIG. 16f, and FIG. 16i are SEM images of the surface of perfluorooctanamide-functionalized fabric 1605. Compared to the untreated fabric surfaces seen in FIG. 16g, the morphologies of APTMS-functionalized and perfluorooctanamide-functionalized fabric surfaces in FIG. 16h and FIG. 16i are obviously rougher.

Figure 16J:
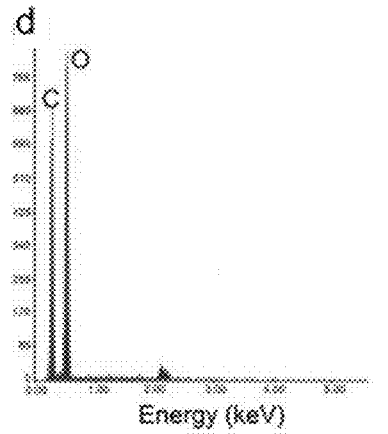
Figure 16K:
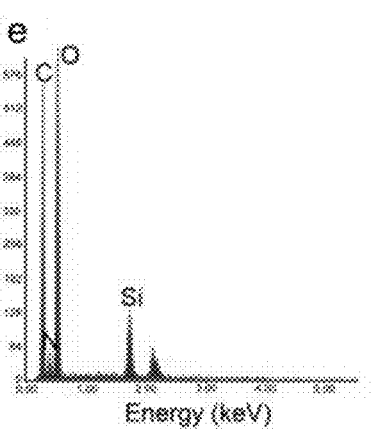
Figure 16L:
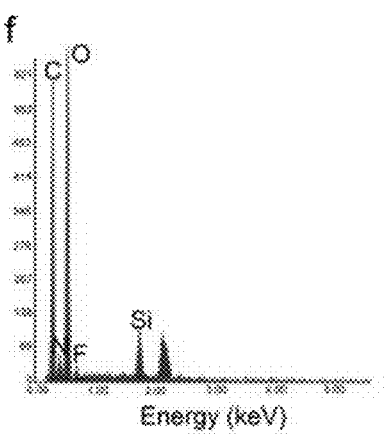

Silicon (Si) and nitrogen (N) are detected in the APTMS-functionalized fabric surfaces in FIG. 16k. Furthermore, Si, N and fluorine (F) are detected in the perfluorooctanamide-functionalized fabric surfaces in FIG. 16l. As expected, none of these elements is detected on the surface of the untreated fabric as shown in FIG. 16j. These results provide evidence of successful treatment of fabric surfaces with APTMS and perfluorooctyl iodide.

Figure 17:
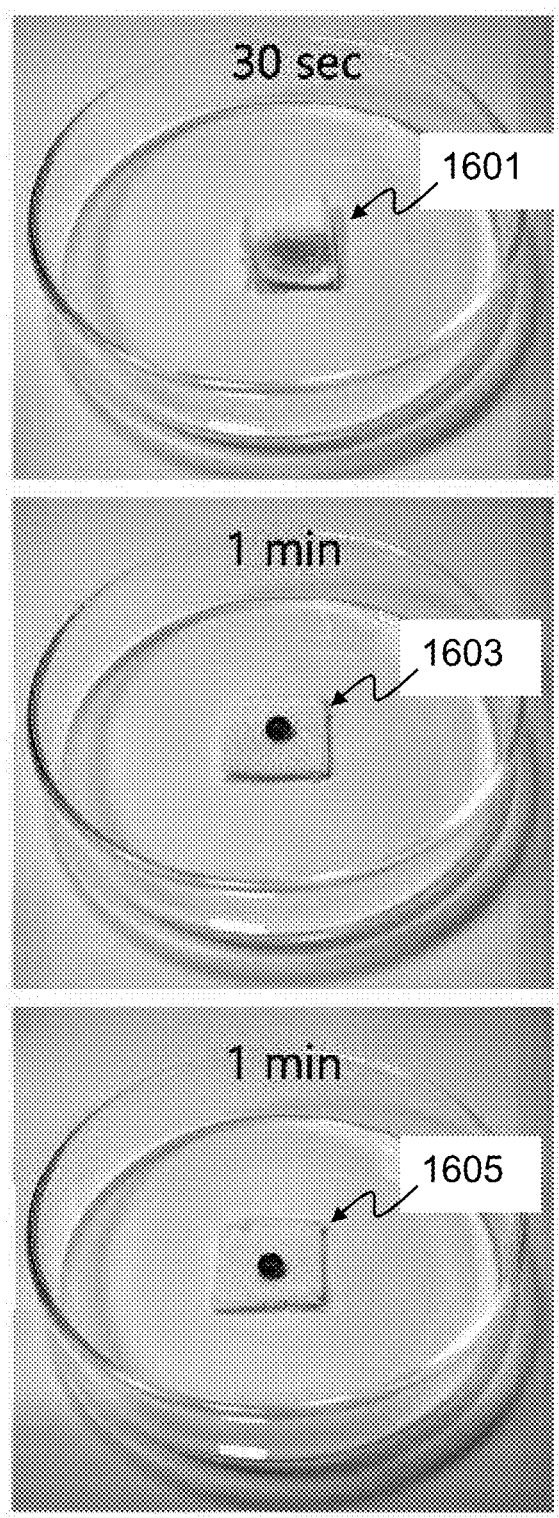
FIG. 17 demonstrates the hydrophobic and water-repellent property of fabric that provided the images of FIGS. 16a-16l.

FIG. 17 shows the wettability test results of fabric surface-functionalized with the afore-described method. The top photograph shows a water droplet readily sucked in by untreated fabric 1601. The middle photograph shows how a drop of water rests on the APTMS-functionalized fabric 1603 without being absorbed. The bottom photograph also shows how a drop of water rests on perfluorooctanamide-functionalized fabric 1605. The middle and bottom photographs indicate that the hydrophilic fabric surface has become hydrophobic, and exhibits strong water repellence.

The skilled reader would appreciate that the described surface functionalization method can be applied to mixed fabrics, such as materials of 65% cotton and 50% cotton (not illustrated), the remainder being polyester or wool. The 65% cotton and 50% cotton material will also exhibit water repellence.

Figure 18:
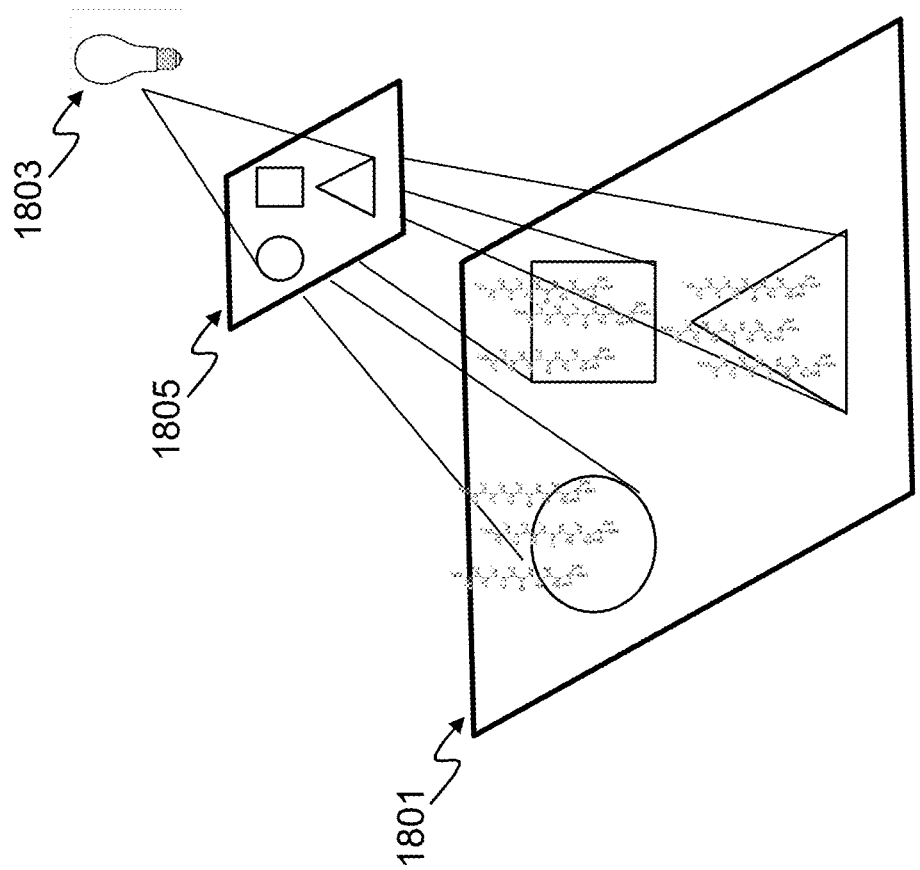
FIG. 18 shows a photo-masking process that uses the embodiment of FIG. 3.

FIG. 18 shows another embodiment, which is a piece of material 1801 that has a surface which is only partially perfluorooctanamide-functionalized. The perfluorooctanamide-functionalization is made on a specific area or areas that are only a part of the whole surface. The area or areas is subject to the photo-catalysis afore-described by shining light 1803 onto the material 1801 through a photomask 1805 stencil. Possibly, such physical patterning can bring additional functional properties, such as an improved structure-based hydrophobic property.

Besides the examples given, the described method can be applied to many other materials, such as glass, ceramics and metals with oxide surface.

The afore-described embodiments include a two-step process, which includes a step of silanization of hydroxyl groups on the surface of a material, to overlay hydroxyl groups with amine functional groups, and a subsequent step of photo-catalytic amidation with perfluoroalkyl iodide in the presence of a photo-catalyst.

Figure 19:
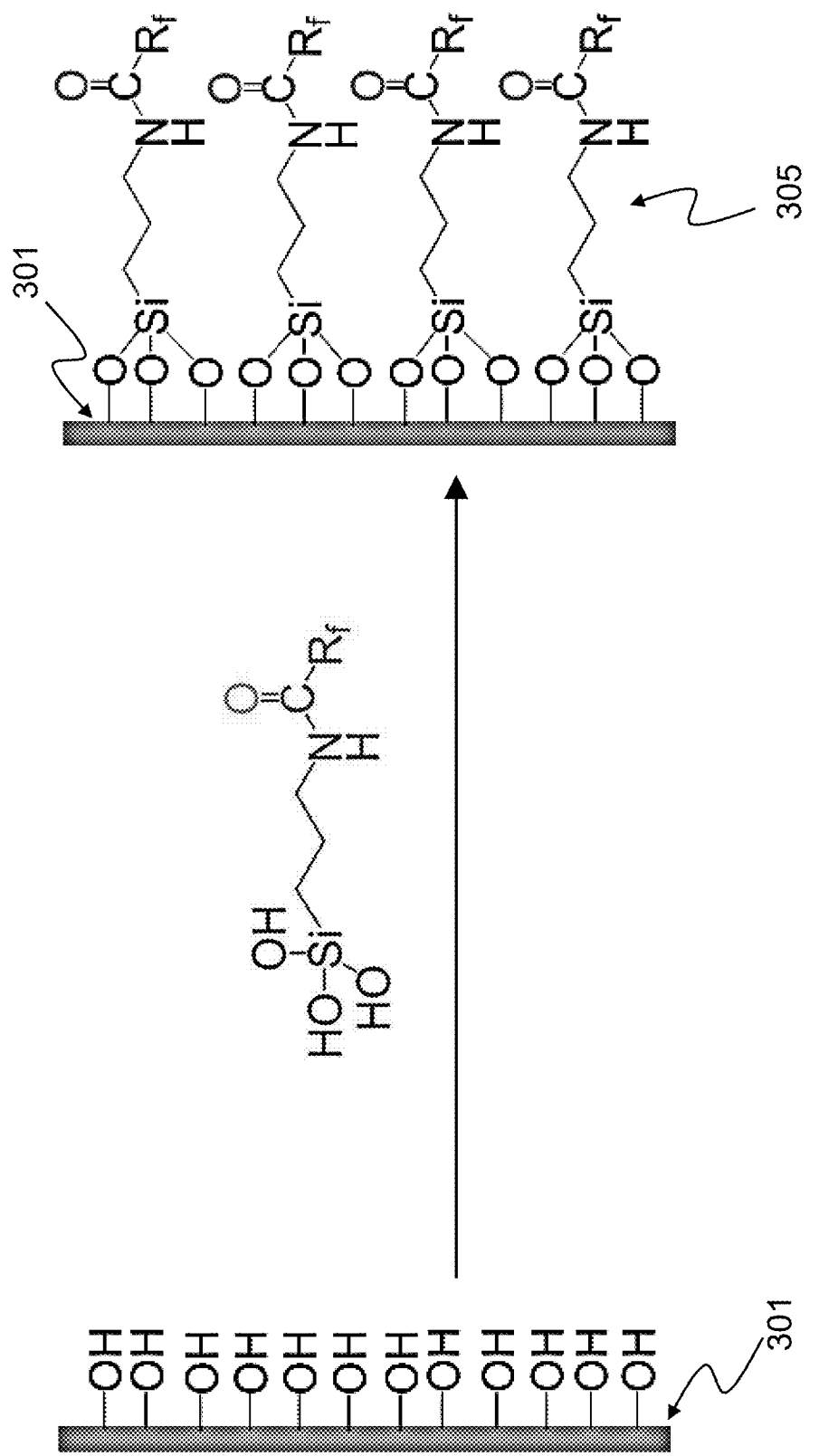
FIG. 19 shows an embodiment that is an alternative to the embodiment of FIG. 3.

In other embodiments, the sequence of silanization and photo-catalysis can be reversed in some embodiments. FIG. 19 is an optional downstream process to the reaction shown in FIG. 6. FIG. 19 illustrates how N-[3-(trihydroxylsilyl)propyl] perfluorooctanamide, which was made in an earlier homogeneous photo-catalysis stage, is attached in a later stage to the surface of a solid material. Therefore, FIG. 19 relates also to a two-stage process which also uses APTMS and perfluorooctyl iodide sequentially, except that the photo-catalysis takes place before silanization of the material with n-(trihydroxylsilyl)alkyl] perfluoroalkanamide.

Other embodiments are also within the contemplation of this application. For example, while APTMS is the preferred choice in some of the described embodiments, other silane moiety functional groups such as a compound represented by the formula $R_1SiR_2NH_2$ can be used instead. In particular, APTMS may be replaced by APTES (3-aminopropyl)-triethoxysilane, APDEMS (3-aminopropyl)-diethoxy-methylsilane, APDMES (3-aminopropyl)-dimethyl-ethoxysilane and so on.

The surface having the amine functional group can then be functionalized with any perfluoroalkyl halide characterized by the general formula $C_nF_{2n+1}X$, wherein X is a halide, and wherein n may range from 3 to 20. For most useful purposes, as mentioned elsewhere in this application, n is preferably 3 to 11.

In some embodiments, instead of iodide, the halide can be chloride or bromide, or even a suitable organic ion.

Other photosensitizer can be used instead of fac-[Ir(ppy)$_3$], and this depends on the optimization potential of the form of amides and perfluoroalkyl halides.

While there has been described in the foregoing description preferred embodiments of the present invention, it will be understood by those skilled in the technology concerned that many variations or modifications in details of design, construction or operation may be made without departing from the scope of the present invention as claimed.

The invention claimed is:

1. A method of rendering a material with a hydrophobic surface, comprising the steps of:
    (a) immersing the material in a first solution comprising a silane to silanize the material;
    (b) immersing the product of step (a) in a second solution comprising perfluoroalkyl halide and a photo-catalyst to load the silanized material with perfluoroalkyl halide and the photo-catalyst; and
    (c) irradiating the product of step (b) with light thereby rendering the material with the hydrophobic surface.

2. The method as claimed in claim 1, wherein
    in step (a), the silane is N-(trimethoxysilyl)alkylamine;
    in step (b), the photo-catalyst is fac-tris(2-phenylpyridine) iridium (fac-[Ir(ppy)$_3$]); and
    in step (c), N-[3-(trihydroxylsilyl alkyl] perfluoroalkanamide is formed on the silanized material after irradiation.

3. The method as claimed in claim 2, wherein
    the N-(trimethoxysilyl)alkylamine is 3-(trimethoxysilyl) propylamine (APTMS) the perfluoroalkyl halide is perfluorooctyl iodide; and
    the N-[3-(trihydroxylsilyl)alkyl] perfluoroalkanamide is N-[3-(trihydroxylsilyl)propyl] perfluorooctoanamide.

4. The method as claimed in claim 1, wherein the material is a cotton-containing fabric, a sponge, a cementitious material, wood, glass, a ceramic, or a metal having an oxidized surface.

* * * * *